United States Patent [19]
Nishioka et al.

[11] Patent Number: 5,234,642
[45] Date of Patent: Aug. 10, 1993

[54] HIGH STRENGTH SILICON NITRIDE SINTERED BODY AND PROCESS FOR PRODUCING SAME

[75] Inventors: Takao Nishioka; Akira Kuibira; Kenji Matsunuma; Yoshishige Takano; Matsuo Higuchi; Masaaki Honda; Masaya Miyake, all of Hyogo, Japan

[73] Assignee: Sumitomo Electric Industries, Ltd., Osaka, Japan

[21] Appl. No.: 459,398

[22] Filed: Dec. 29, 1989

[30] Foreign Application Priority Data

May 22, 1989 [JP] Japan .................................. 1-129356
May 22, 1989 [JP] Japan .................................. 1-129357

[51] Int. Cl.$^5$ ................................................ C04B 35/58
[52] U.S. Cl. ............................................... 264/65; 501/97; 501/98
[58] Field of Search ............... 501/98, 97, 96; 264/65

[56] References Cited

U.S. PATENT DOCUMENTS

| | | | |
|---|---|---|---|
| 4,127,416 | 11/1978 | Lumby et al. | 501/98 |
| 4,156,051 | 5/1979 | Nakamura et al. | 501/98 |
| 4,693,857 | 9/1987 | Komeya et al. | 501/98 |
| 4,812,298 | 3/1989 | Kohtoku et al. | 501/98 |
| 4,816,428 | 3/1989 | Kishi et al. | 501/89 |
| 4,820,665 | 4/1989 | Ukai et al. | 501/98 |

FOREIGN PATENT DOCUMENTS

0231130 1/1987 European Pat. Off. .
186266 8/1986 Japan .

OTHER PUBLICATIONS

Chemical Abstracts, vol. 106, No. 4, Jan. 1987, abstract No. 22274b, Columbus Ohio, US; and JP-A-61 186 266 (Agency of Industrial Sciences and Technology et al) Aug. 19, 1986.
Journal of Materials Science, vol. 24, No. 5, May 1989, pp. 1853-1861, Chapman and Hall Ltd, London, GB; T. Ekstrom et al.: "Dense single-phase beta-sialon ceramics by glass-encapsulated hot isostatic pressing" Abstract; pp. 1853-1861.
Reed, *Introduction to Ceramic Processing*, vol. 130, 1988.
Reed, *Introduction to the Principles of Ceramic Processing*, 1988, pp. 286-288.

Primary Examiner—Mark L. Bell
Assistant Examiner—C. Bonner
Attorney, Agent, or Firm—Sughrue, Mion, Zinn, Macpeak & Seas

[57] ABSTRACT

A high-strength silicon nitride sintered body having a flexural strength of 100 kg/mm$^2$ or higher and a process for producing the same are disclosed, the sintered body comprising not less than 90% by weight of a single crystalline phase of silicon aluminum oxynitride ($Si_{6-z}Al_zO_zN_{8-z}$, wherein z is a number of from 0 to 4.2) having an average longer diameter of not more than 5 $\mu$m and an aspect ratio of not less than 5, the crystal phase constituting a network structure in the sintered body, the balance being a crystalline or amorphous (glassy) phase comprising one or more of oxides or oxynitrides of a rare earth metal, a group 3A metal, a group 2A metal or Si, and the process comprising mixing silicon nitride powder, an organic metal salt as a first sintering aid, and at least one of a metal oxide, a metal nitride, and a metal oxynitride as a second sintering aid, either separately or as a mixture of two or more thereof, with a solvent and a surface active agent, subjecting the mixture or mixtures to ultrasonic dispersion, mixing the mixtures together followed by drying to obtain a mixed powder, molding the mixed powder, and sintering the molded article at a temperature of from 1,600° to 2,200° C. in a non-oxidative atmosphere.

11 Claims, 1 Drawing Sheet

HIGH STRENGTH SILICON NITRIDE SINTERED BODY AND PROCESS FOR PRODUCING SAME

FIELD OF THE INVENTION

This invention relates to a high strength sintered body of silicon nitride ($Si_3N_4$) and a process for producing the same.

BACKGROUND OF THE INVENTION

The strength of ceramics is generally influenced by porosity, crystal grain size and the surface conditions thereof. The strength of sintered silicon nitride which has attracted attention as construction ceramics is also governed by these factors. Various sintering aids and sintering methods have been developed in an attempt to improve the strength of sintered silicon nitride. For example, *Am. Ceram. Soc. Bull.*, Vol. 52, p. 560 (1973) reports that flexural strength reaches to 100 kg/mm² in hot-press sintering, and *Yogyo Kyokai Nenkai Koen Yokoshu* (Transaction of Annual Meeting of Ceramic Society), Vol. 178 (1981) reports that flexural strength reaches 100 kg/mm² in normal pressure sintering. In both reports, an improvement on strength is achieved by minimizing porosity.

Processes for producing an $Si_3N_4$—$Y_2O_3$—$Al_2O_3$ sintered body using $Y_2O_3$ as a sintering aid are described in JP-B-49-21091 and JP-B-48-38448 (the term "JP-B" as used herein means an "examined published Japanese patent application").

It is considered, as stated in the literature, that $Si_3N_4$ having a β-crystal lattice has a fibrous structure dispersed in a matrix phase to thereby improve strength and toughness. That is, the fact that the β-crystal lattice of $Si_3N_4$ is of a hexagonal system and isotropically grows in the direction of the c axis is positively taken advantage to improve strength. In some cases, the fibrous crystal grains grow in the longitudinal direction to more than 10 μm as described in JP-B-48-38448 and *Yogyo Kyokaishi* (Journal of Ceramic Society), Vol. 94, p. 96 (1986).

However, since the strengthening mechanism in the above-described processes resides in growth of the fibrous structure, there is the possibility that abnormal grain growth or pore formation may accompany the fibrous structure growth. It is not believed, therefore, that the mechanism is always effective to improve strength.

In particular, in order to obtain a fibrous structure as shown in JP-B-49-21091, hot-press sintering should sometimes be employed, or it is sometimes necessary to add a β-crystal $Si_3N_4$ material which has previously been grown in the fibrous form by a heat treatment and to utilize the growth of this fibrous structure as described in *Yogyo Kyokaishi* (Journal of Ceramic Society), Vol. 94, p. 167 (1986).

Further, according to the processes of JP-B-49-21091 and JP-B-48-38448, $Si_3N_4$ powder is ground and mixed together with oxide powder, e.g., $Y_2O_3$ and $Al_2O_3$, as a chief sintering aid and then sinter-formed, followed by prescribed processing to obtain a sintered body.

However since the aid employed, e.g., $Y_2O_3$ and $Al_2O_3$, is not only hard but highly agglomerative due to the fineness of the primary particles thereof, the use of known grinding media limits mechanical grinding and mixing performance and one encounters difficulty in obtaining submicroscopic particles. Uniform mixing of the sintering aid is also limited.

Further, contamination by impurities arising from the grinding medium used cannot be avoided. The impurities remain in the sintered body to cause defects or non-uniformity of the sintered structure, resulting in a reduction of strength.

SUMMARY OF THE INVENTION

In the light of these circumstances, the inventors conducted extensive studies. As a result, it has been found that a sintered body in which fine and uniform β-crystals having a high aspect ratio constitute a matrix phase exhibits higher strength than a fiber-strengthened sintered body in which long fibrous crystals are dispersed in a matrix phase.

This invention relates to a high-strength silicon nitride sintered body having a flexural strength of 100 kg/mm² or higher, which comprises not less than 90% by weight of a single crystalline phase of silicon aluminum oxynitride ($Si_{6-z}Al_zO_zN_{8-z}$, wherein z is a number of from 0 to 4.2) having an average longer diameter of not more than 5 μm and an aspect ratio of not less than 5, the crystal phase constituting a network structure in the sintered body, the remainder being a crystalline or amorphous (glassy) phase comprising one or more oxides or oxynitrides of a rare earth metal, a group 3A metal, a group 2A metal or Si.

The high-strength silicon nitride sintered body of this invention embraces two embodiments, namely:

(1-a) a sintered body in which the balance is a crystalline or amorphous (glassy) phase comprising at least three elements selected from the group consisting of Y, Si, Al, O, and N, and (1-b) a sintered body containing not more than 500 ppm of one or more metallic elements selected from the group consisting of Cr, Co, Hf, Fe, Mo, Ni, Nb, Ti, W, and Zr.

This invention further relates to a process for producing a silicon nitride sintered body which comprises mixing (1) silicon nitride powder, (2) an organic metal salt as a first sintering aid, and (3) at least one of a metal oxide, a metal nitride, and a metal oxynitride as a second sintering aid, either separately or as a mixture of two or more of (1) to (3), with a solvent and a surface active agent (inclusive of a dispersing agent or a deflocculating agent, hereinafter the same), subjecting the mixture or mixtures to ultrasonic dispersion, mixing the mixtures together followed by drying to obtain a mixed powder, molding the mixed powder, and sintering the molded article at a temperature of from 1,600° to 2,200° C. in a non-oxidizing atmosphere (hereinafter referred to as first process).

The first process of this invention embraces the following embodiments:

(2-a) A process where the organic metal salt is an organic metal salt of Y and/or Al, the metal oxide is $Al_2O_3$ or $Y_2O_3$, and the metal nitride is AlN.

(2-c) A process according to embodiment (2-a) where the organic metal of Y and/or Al is at least one member selected from the group consisting of a stearate, a naphthenate, an acetylacetone complex, and an octylate.

(2-d) A process according to embodiment (2-a) where the organic metal salt of Y and/or Al is an alkoxy metal salt such as $Al(O-i-C_3H_7)_3$ and $Al(O-n-C_4H_9)_3$.

(2-e) A process according to embodiment (2-a) where the silicon nitride powder is a silicon nitride powder having an average primary particle diameter of not more than 1.0 μm which is obtained by an imide decomposition process, and the sintering aids have an average primary particle diameter of not more than 1 μm.

(2-f) A process according to embodiment (2-a) where the sintering is carried out at a temperature (e.g., the nitrogen content is 90% by volume or more and the balance of Ar, CO, H$_2$, etc.) of from 1,600° to 2,000° C. in a non-oxidizing atmosphere under a nitrogen gas pressure of from 10 to 2,000 atm.

(2-g) A process according to embodiment (2-a) wherein the mixture after ultrasonic dispersing is classified through a sieve of 44 μm or smaller mesh.

The present invention still further relates to a process for producing a silicon nitride sintered body which comprises mixing (1) a silicon nitride powder and (2) least one of a metal oxide, a metal nitride, and a metal oxynitride as a sintering aid, either separately or as a mixture of two or more of (1) and (2), with a solvent and a surface active agent, subjecting the mixture or mixtures to ultrasonic dispersion, mixing the mixtures together followed by drying to obtain a mixed powder, molding the mixed powder, and sintering the molded article at a temperature of from 1,600° to 2,200° C. in a non-oxidizing atmosphere (hereafter referred to as a second process).

The second process of this invention embraces the following embodiments:

(3-a) A process wherein the silicon nitride powder is a silicon nitride powder having an average primary particle diameter of not more than 1.0 μm which is obtained by an imide decomposition process, and the sintering aid has an average primary particle diameter of not more than 1 μm.

(3-b) A process wherein the sintering is carried out at a temperature of from 1,600° to 2,000° C. in a non-oxidizing atmosphere under a nitrogen gas pressure of from 10 to 2,000 atm.

(3-c) A process wherein the mixture, after ultrasonic dispersing, is classified through a sieve of 44 μm or smaller mesh.

DETAILED DESCRIPTION OF THE INVENTION

Figure 1:
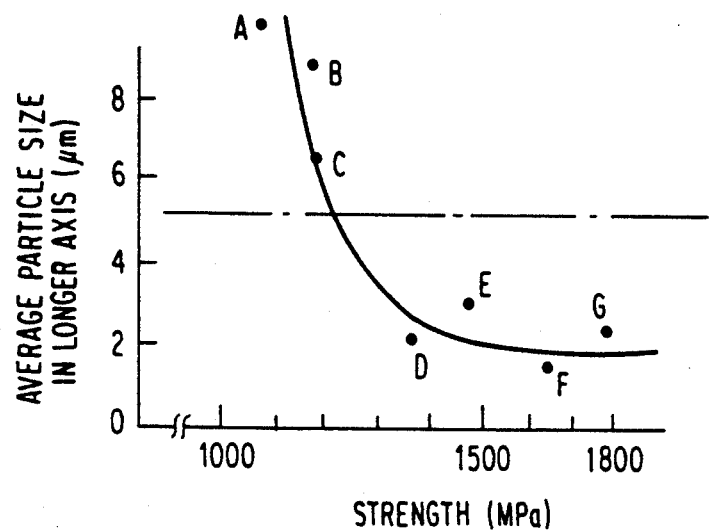
FIG. 1 is a graph showing the relationship between average particle size in the longer axis and strength of a silicon nitride sintered body.

The sintered body of Si$_3$N$_4$ according to the present invention mainly comprises a network structure of β silicon aluminum oxynitride crystals having a longer diameter of not more than 5 μm, preferably from 2 to 5 μm, and an aspect ratio of not less than 5, preferably from 5 to 10, under sufficient grain size control and markedly exhibits higher strength as compared with a conventional fibrous structure strengthened sintered body.

The sintered body of this invention is preferably obtained from an Si$_3$N$_4$ powder having an average particle size (FSSS) of not more than 0.5 μm, an oxygen content of not more than 2% by weight (based on the weight of Si$_3$N$_4$), an α crystallinity of not less than 95%, and a size distribution represented by the relationship $3\sigma \leq 0.2$ μm. Further, the sintering aids are preferably added in an amount of not more than 10% by weight based on the Si$_3$N$_4$ powder.

In order to attain sufficient strength, the sintered body must contain at least 90% by weight, preferably from 90 to 95% by weight, of the network structure of silicon aluminum oxynitride crystals.

It is necessary that the crystalline phase constituting the network structure comprise a single β type silicon aluminum oxynitride crystal phase containing no α type crystal structure in which other elements, e.g., Y and Mg, are incorporated into the crystal to form a solid solution.

The balance of the sintered body comprises other crystalline or amorphous (glassy) phases similarly to general silicon nitride sintered bodies. It is particularly advantageous, for increasing the density of the sintered body, that the remainder comprises at least one oxide or oxynitride of a rare earth metal, a group 3A metal, a group 2A metal, or Si.

It is more preferable that the crystalline or amorphous phase of the balance comprises at least one of oxide or oxynitride at least three elements selected from the group consisting of Y, Si, Al, O, and N.

Metallic elements such as Cr, Co, Hf, Fe, Mo, Ni, Nb, Ti, W and Zr react with SiO$_2$ or a mixed oxide or a mixed oxynitride of SiO$_2$ and a sintering aid, which is present on the surface of Si$_3$N$_4$ because of surface oxidation during preparation or mixing of the starting materials, to form the corresponding silicide. This reaction is often attended by volumetric shrinkage to cause pores or defects in the sintered body, which leads to a reduction in the strength and reliability of the sintered body.

Methods of synthesizing Si$_3$N$_4$ powder generally include (1) direct nitriding of metallic silicon, (2) reduction of SiO$_2$, (3) gaseous synthesis and (4) imide decomposition process.

The imide decomposition process is disclosed, e.g., in T. Yamada, et al, *Proc. 1st Internat. Sympo. Ceramic Components for Engine* (1983), pp.333, published by KTK Scientific Publishers, Japan (1984) and Y. Kohtoku, et al, *Proc. 2nd Internat. Sympo. Ceramic Materials and Components for Engine* (Apr. 14–17, 1986), published by Verlag Deutsche Keramische Gesellschaft, FRG (1987).

Figure 2:
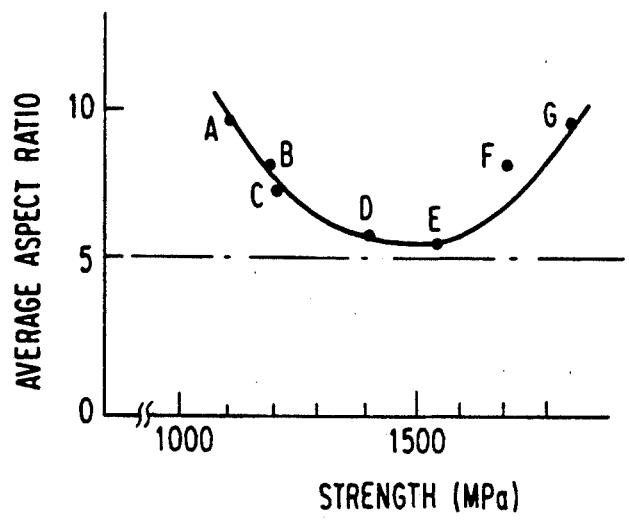
FIG. 2 is a graph showing the relationship between average aspect ratio and strength of a silicon nitride sintered body.

In order to examine the relationship between particle characteristics and strength of a sintered body, Si$_3$N$_4$ sintered bodies of 7 kinds (A to G) were prepared using various Si$_3$N$_4$ powders which satisfy the above-specified characteristics, i.e., an average particle size of not more than 0.5 μm, an oxygen content of not more than 2% by wight, and a degree of α crystallization of not less than 95%, etc. The structure of the sintered bodies were observed according to the method of Ziegler G., et al, *Science of Ceramics.* Vol. 12, p. 361 (1984), and the strength of the sintered bodies was determined according to JIS R1601 (three-point bending test). The relationship between the average longer diameter of the crystals and strength is shown in FIG. 1, and the relationship between the average aspect ratio and strength is shown in FIG. 2. In addition, on close examination of the structure of the sintered bodies, those having a high strength of 130 kg/mm$^2$ or more revealed sufficient formation of the above described network structure of a β crystal lattice.

From all these results, it can be seen that a sintered body in which the β crystal lattice has a longer particle diameter of not more than 5 μm and an aspect ratio of not less than 5, and such a β crystal lattice forms a network structure, has a high strength that has never been reached by conventional $Si_3N_4$ materials.

On the other hand, the balance other than the silicon aluminum oxynitride crystalline phase having a network structure is preferably a crystalline or amorphous (glassy) phase comprising at least one oxide or oxynitride of a rare earth metal, a group 3A metal, a group 2A metal or Si which are considered effective to increase the density of a sintered body.

The high-strength silicon nitride sintered body according to the present invention is preferably produced by the first and second processes given above.

The sintered body of the present invention may also be produced by a process comprising uniformly dispersing $Si_3N_4$ powder and an organic metal salt as a sintering aid in a solvent, calcining the resulting dispersion in which the dispersion is dried and, at the same time, the organic metal salt is oxidized and uniformly deposited onto the surface of the $Si_3N_4$ powder, and molding and sintering the resulting powder (hereinafter referred to as the third process).

Included in the third process are the following embodiments:

(4-a): A process where the organic metal salt is an organic metal salt of Y and/or Al;
(4-b):
(4-c): A process according to the embodiment (4-a) wherein said organic metal salt of Y and/or Al is at least one member selected from the group consisting of a stearate, a naphthenate, an acetylacetone complex, and an octylate; and
(4-d): A process according to embodiment (4-a) where the organic metal salt of Y and/or Al is an alkoxy metal salt.

The first and second processes according to the present invention are described below in detail.

In the first process, an organic metal salt containing Y, Al or a like metal is uniformly dispersed in a solvent in the dissociated state on the molecular order. Separately, $Si_3N_4$ powder is uniformly dispersed in a solvent with the aid of an agent for improving the dispersibility of fine particles such as a deflocculating agent. The $Si_3N_4$ dispersion is mixed with the organic metal salt dispersion to adsorb the organic metal salt onto the surface of the $Si_3N_4$ powder.

In carrying out uniform dispersion in a solvent, (i) each one or more of the $Si_3N_4$ powder having an average primary particle diameter of not more than 1.0 μm, the organic metal salt as a first sintering aid, and at least one of an oxide powder, a nitride powder and an oxynitride powder as a second sintering aid, (ii) a solvent, and (iii) a surface active agent, inclusive of a dispersing agent or a deflocculating agent, are mixed, and each mixture is exposed to ultrasonic waves to uniformly and finely disperse the agglomerates of the primary particles without permitting the incorporation of impurities. The resulting dispersions are combined and mixed followed by drying to obtain a uniform mixture of submicroscopic particles.

Even where the first sintering aid, i.e., the organic metal salt, is not employed, use of the surface active agent and ultrasonic dispersion suffice to grind powder agglomerates to achieve uniform mixing, i.e., the second process of the present invention.

The metal oxide, nitride or oxynitride used is preferably has an average primary particle diameter of not greater than 1 μm.

In the first process of the present invention, the total amount of the first and second sintering aids is preferably from 5 to 15% by weight, more preferably from 5 to 10% by weight, in terms of at least one of a metal oxide, a metal nitride and a metal oxynitride, based on the amount of the silicon nitride powder. The amount of the first sintering aid is preferably from 0.5 to 2% by weight, in terms of at least one of a metal oxide, a metal nitride and a metal oxynitride, based on the amount of the silicon nitride powder. The amount of the second sintering aid is preferably from 3 to 14.5% by weight, in terms of at least one of a metal oxide, a metal nitride and a metal oxynitride, based on the amount of the silicon nitride powder.

If the amount of the first sintering aid is less than 5% by weight, the uniform coating function of the first sintering aid tends to be insufficient. If it is more than 2% by weight, carbon, which remains after heat-decomposition of the organic metal salt, may adversely affect the sintering property of the resulting sintered product.

In the second process of the present invention, the amount of the sintering aid is preferably from 5 to 15% by weight based on the amount of the silicon nitride powder.

In the first and second processes of the present invention, the amount of the surface active agent is preferably from 0.1 to 1.0% by weight in terms of the solid content based on the total amount of the silicon nitride powder, the first sintering aid if any, and the second sintering aid. If the amount of surface active agent is less than 0.1% by weight, the effect of the addition tends to be insufficient. If it is more than 1.0% by weight, spring back tends to disadvantageously occur during the molding process of the mixed powder by pressing or the like.

The amount of the solvent in the first and second processes of the present invention is preferably from 10 to 200% by weight based on the total amount of the silicon nitride powder, the first sintering aid if any, and the second sintering aid. If the amount of the solvent is less than 50% by weight, the effect of the ultrasonic dispersion tends to be insufficient because of the high concentration. If it is more than 200% by weight, it is disadvantageous in view of the production cost.

The output power of the apparatus used for the ultrasonic dispersion is preferably 300 W or more. The dispersing temperature is preferably 30° C. or lower. In the process of the present invention, sufficient dispersion can be attained by the ultrasonic dispersion even at a low temperature of 30° C. or lower.

A conventional method of adding a sintering aid to an $Si_3N_4$ powder in which oxide particles are finely pulverized (break-down) and then mixed with an $Si_3N_4$ powder has a limit and unavoidably involves contamination by impurities. On the contrary, the method of the present invention in which the sintering aid is built up from a molecular organic metal salt uniformly dispersed in a solvent makes it possible to obtain a mixed powder uniformly containing the sintering aid.

Because the organic metal salt has a low bulk density and limited solubility in solvents, the permissible amount of the organic metal salt to be added is thus limited. To make up for this deficiency in solubility, a prescribed amount of $Al_2O_3$, $Y_2O_3$, AlN, etc., powder dispersed in a solvent is additionally supplied to the above mixture. After thorough mixing, the mixed dispersion is dried, and the residue is calcined in an oxidizing atmosphere to prepare $Si_3N_4$ powder having uniformly deposited $Y_2O_3$, $Al_2O_3$, etc., on the surface thereof. The resulting powder is molded and sintered in a conventional manner.

Thus, localization of the sintering aid and incorporation of impurities which cause defects or abnormal grain growth in a sintered body can be prevented, thereby providing a uniform and defect- or pore-free sintered body having a markedly improved strength over conventional ones.

Of the organic metal salts, preferred are those of stearic acid, naphthenic acid, acetylacetone, and octylic acid due to the fact that organic metal salts having a linear, and large molecule in the organic moiety thereof are inferior in uniform mixing properties.

Use of ultrasonic waves for dispersion preferably combined with the use of $Si_3N_4$ powder having an average primary particle diameter of not greater than 1.0 $\mu$m prevents localization of the sintering aid and incorporation of impurities which would cause defects or abnormal grain growth in the sintered body. Thus, defects or pore formation in the sintered body arising primarily from metallic impurities are considerably reduced, thereby providing a uniform and defect- and pore-free sintered body having a markedly improved strength over conventional ones.

To ensure the high strength of the sintered body, the $Si_3N_4$ powder having an average primary particle diameter of not greater than 1.0 $\mu$m is advantageously one prepared by an imide decomposition process which provides uniform and fine primary particles while minimizing contamination by metallic impurities.

It is preferable, for achieving uniform and fine dispersion and uniform mixing, that the surface active agent is separately added to each of the $Si_3N_4$ powder and the sintering aid powder and, after ultrasonic dispersion, the resulting dispersions are mixed together.

Taking it into account that some surface active agents tend to cause agglomeration of fine particles, it is necessary to chose a proper deflocculation treatment for each powder.

Thus, an $Si_3N_4$ sintered body having a flexural strength of 100 kg mm$^2$ or higher (as measured according to JIS R1601) and high reliability can easily be obtained even by normal pressure sintering.

The present invention is now illustrated by way of the following Examples, but it should be understood that the present invention is not deemed to be limited thereto. In the Examples, all the percents are given by weight unless otherwise specified.

EXAMPLE 1

Ninety-two percent of $Si_3N_4$ powder having an average particle size of 0.3 $\mu$m, a size distribution $3\sigma$ of 0.20 $\mu$m, an $\alpha$ crystallinity of 96.5%, and an oxygen content of 1.4%, 4% of $Y_2O_3$ powder having an average particle size of 0.8 $\mu$m, 3% of $Al_2O_3$ powder having an average particle size of 0.5 $\mu$m, and 1% of AlN powder having an average particle size of 1.0 $\mu$m were wet blended in ethanol in a ball mill for 100 hours and dried. The resulting mixed powder was subjected to CIP (cold isostatic press) molding under a pressure of 5,000 kg cm$^2$. The molded article was maintained at 1,600° C. for 4 hours under a nitrogen pressure of 1 atm and then further sintered at 1,750° C. for 6 hours under the same atmosphere and pressure. The resulting sintered body was subjected to an HIP (hot isotactic press) treatment at 1,700° C. for 2 hours in a nitrogen gas at 1,000 atm.

The sintered body after being maintained at 1,600° C. had a $\beta$ crystallinity of 92.5% and a relative density of 89.5%, while after being sintered at 1,750° C. for 6 hours, the sintered body had a $\beta$ crystallinity of 100% and a relative density of 98.9%. The relative density reached 100% after the HIP treatment.

Test specimens in accordance with JIS R1601 (3×4×40 mm) were cut out of the resulting sintered body, and the side of each specimen where tension stress is to be applied was polished with a diamond paste so as to have a surface roughness of 0.2S.

Thirty specimens were inspected using the conventional three-point bending test to give an average strength of 152 kg/mm$^2$ and a Weibull modulus of 15.

Examination of the structure of the sintered body according to the method of Ziegler G., et al, *Science of Ceramics*, Vol. 12, p. 361 (1984), revealed that the $\beta$ crystal lattice had an average longer diameter of 2 $\mu$m and an average aspect ratio of 5.8 and that the crystalline phase had a sufficient network structure.

Further, the sintered body was found to have a thermal conductivity of 90 W/mk, much higher than that of general $Si_3N_4$ sintered bodies, thus ascertaining that the $\beta$ crystal lattice provides a sufficient network structure.

EXAMPLE 2

The same $Si_3N_4$ powder as used in Example 1 was mixed with each of the compositions shown in Table 1 below, and the resulting mixed powder was charged in a graphite mold and hot pressed at 1,700° C. and 400 kg/cm$^2$ for 4 hours. Three-point bending strength of each of the resulting sintered bodies was measured according to JIS R1601, and the average particle size and average aspect ratio were determined by structural observations. In addition, the percentage of the volume occupied by the crystalline phase was obtained. The results are shown in Table 1.

TABLE 1

| No. | Composition (wt %) $Al_2O_3$ | $Y_2O_3$ | AlN | Strength (kg/mm$^2$) | Average particle size ($\mu$m) | Average aspect ratio | $\beta$-crystalline phase (%) |
|---|---|---|---|---|---|---|---|
| 1 | 3 | 3 | 2 | 142 | 4.5 | 5.8 | 93 |
| *2 | 3 | 15 | 5 | 85 | 8.6 | 6.2 | 82 |
| *3 | 5 | 2 | 3 | 76 | 4.2 | 3.2 | 94 |
| 4 | 2 | 5 | 1 | 151 | 3.5 | 7.0 | 94 |
| 5 | 2 | 7 | 2 | 165 | 3.0 | 8.2 | 93 |
| *6 | 10 | 15 | — | 80 | 5.1 | 3.0 | 80 |
| *7 | — | 5 | 1 | 90 | 4.0 | 4.3 | 96 |

Note:
*Comparative Examples

It can be seen from the results of Table 1 that the sintered bodies according to the present invention are markedly superior in strength.

EXAMPLE 3

Ninety-two percent of $Si_3N_4$ powder having an average particle size of 0.3 $\mu$m, a size distribution $3\sigma=0.20$ $\mu$m, an $\alpha$ crystallinity of 96.5%, and an oxygen content of 1.4% and 0.5% of a carboxylic acid type deflocculating agent were mixed in isopropanol and twice subjected to a deflocculation treatment using a ultrasonic homogenizer (output: 600 W; frequency: 25 KHz) to prepare dispersion A.

Separately, each of 5% of $Y_2O_3$ powder having an average particle size of 0.9 μm, 2% of $Al_2O_3$ powder having an average particle size of 0.3 μm, and 1% of AlN powder having an average particle size of 0.9 μm was poured into isopropanol, and 0.5% of a carboxylic acid type deflocculating agent was added thereto. Each mixture was twice subjected to a deflocculation treatment using an ultrasonic homogenizer under the same conditions as used above to prepare a dispersion B, C, or D, respectively.

Dispersions A to D were mixed and dispersed by means of a simple agitator at 5,000 rpm for 5 hours.

The resulting mixed powder was CIP molded under a pressure of 5,000 kg/cm² and sintered at 1,750° C. for 6 hours in a nitrogen atmosphere. The sintered body was then subjected to an HIP treatment at 1,700° C. and at a nitrogen pressure of 1,000 atom for 2 hours.

Test specimens according to JIS R1601 (3×4×40 mm) were cut out of the sintered body, and the side on which a tension stress was to be applied was polished with a diamond paste so as to have a surface roughness of 0.2S. Results of three-point bending tests on 30 specimens were 145 kg/mm² in strength and 25 in Weibull modulus.

EXAMPLE 4

Ninety-two percent of $Si_3N_4$ powder having an average particle size of 0.5 μm and an α crystallinity of 96% which was obtained by an imide decomposition process, 5% of $Y_2O_3$ powder having an average particle size of 0.9 μm, and 2% of $Al_2O_3$ powder having an average particle size of 0.3 μm were mixed according to each of the following mixing methods (4-i) to (4-v), dried, and granulated. The resulting mixed powder was CIP molded at 2,000 kg/cm² and sintered at 1,750° C. for 6 hours in nitrogen gas. The sintered body was then subjected to an HIP treatment at 1,700° C. for 2 hours in a nitrogen gas of 2,000 atom.

Test specimens according to JIS R1601 (3×4×40 mm) were cut out of the resulting sintered body, and the side on which a tension stress was to be applied was polished with a diamond paste so as to have a surface roughness of 0.2S. Conventional three-point bending tests were carried out on 30 specimens.

Mixing Method (4-i) $Si_3N_4$ powder and 0.5% of a carboxylic acid type deflocculating agent (A) were mixed in ethanol and twice subjected to a deflocculation treatment using an ultrasonic homogenizer (output: 600 W; frequency: 25 KHz) to prepare dispersion (A). Each of $Y_2O_3$ powder and $Al_2O_3$ powder and 0.5% of a carboxylic acid type deflocculating agent (B) were mixed in ethanol and subjected to the same defloculation treatment as above to prepare dispersions (B) and (C), respectively. Dispersions (A), (B), and (C) were mixed in a high speed agitator at 8,000 rpm for 2 hours.

(4-ii) All the powders used in (i) above and ethanol were put in a ball mill composed of a pot and balls made of $Al_2O_3$ and mixed at 100 rpm for 100 hours.

(4-iii) $Si_3N_4$ powder, 0.5% of a carboxylic acid type deflocculating agent (A), and ethanol were put in a ball mill (1) composed of an $Al_2O_3$ pot and $Al_2O_3$ balls. $Y_2O_3$ powder, 0.5% of a carboxylic acid type deflocculating agent (B), and ethanol were put in a ball mill (2), and $Al_2O_3$ powder, 0.5% of a carboxylic acid deflocculating agent (C), and ethanol were put in a ball mill (3). Each mixture was preliminarily mixed for 12 hours in its respective ball mill. The mixtures in ball mills (2) and (3) were poured into ball mill (1), followed by mixing for additional period of 84 hours.

(4-iv) The same as in (ii) above, except for replacing the $Al_2O_3$ ball mills with $Si_3N_4$ ball mills.

(4-v) The same as in (iii) above, except for replacing the $Al_2O_3$ ball mills with $Si_3N_4$ ball mills.

Various characteristics of the resulting sintered bodies are shown in Table 2 below.

TABLE 2

| Run No. | Mixing method | Density (g/cc) | Three-point bending strength (kg/mm²) | Weibull modulus |
|---|---|---|---|---|
| 1 | (4-i) | 3.255 | 142 | 27 |
| *2 | (4-ii) | 3.265 | 108 | 13 |
| *3 | (4-iii) | 3.264 | 115 | 15 |
| *4 | (4-iv) | 3.253 | 122 | 18 |
| *5 | (4-v) | 3.252 | 125 | 17 |

Note:
*Comparative example

After the three-point bending tests, the starting point of the break was inspected. As a result, impurities due to localized Al was observed in Run Nos. 2 and 3; also, coarse β-$Si_3N_4$ crystal grains were obtained in Run Nos. 4 and 5. Further, localization of $Al_2O_3$ coming from the balls and the pot was observed in Run Nos. 2 and 3; β-$Si_3N_4$ coming from the balls and the pot was observed in Run Nos. 4 and 5. It is believed that these impurities become grain growth nuclei during sintering, thus ascertaining the significance of the present invention.

EXAMPLE 5

Ninety-two percent of $Si_3N_4$ powder having an average particle size of 0.5 μm and an α crystallinity of 96% which was obtained by an imide decomposition process, 5% of $Y_2O_3$ powder having an average particle size of 0.9 μm, and 2% of $Al_2O_3$ powder having an average particle size of 0.3 μm were mixed according to mixing method (5-i) or (5-ii) set forth below. The resulting mixture was classified through a 500 mesh sieve, and the residue on the sieve was weighed to evaluate the dispersion and mixing properties. The results obtained are shown in Table 3 below.

On the other hand, the mixture as above prepared was dried and granulated, and the resulting mixed powder was CIP molded at 5,000 kg/cm² and sintered at 1,750° C. for 6 hours in nitrogen gas. The sintered body was subjected to an HIP treatment at 1,700° C. for 2 hours in nitrogen gas at 1,000 atm.

Test pieces according to JIS R1601 (3×4×40 mm) were cut out of the resulting sintered body, and the side on which tension stress was to be applied was polished with a diamond paste so as to have a surface roughness of 0.2S. Conventional three point bending tests were carried out on 30 specimens per sample. The results obtained are shown in Table 3 below.

Mixing Method (5-i) $Si_3N_4$ powder and 0.5% of a carboxylic acid type deflocculating agent (A) were mixed in ethanol and twice subjected to a deflocculation treatment using a ultrasonic homogenizer (output: 600 W; frequency: 25 KHz) to prepare dispersion (A). $Y_2O_3$ powder and 0.5% of a carboxylic acid deflocculating agent (B) were mixed in ethanol and deflocculated in the same manner as described above to prepare a dispersion (B). $Al_2O_3$ powder and 0.5% of a carboxylic acid type deflocculating agent (C) were mixed in ethanol and deflocculated in the same manner as described above to prepare dispersion (C). Dispersions (A), (B), and (C) were mixed in a high speed agitator at 8,000 rpm for 2 hours.

(5-ii) The same as in mixing method (5-a), except for using no flocculating agent.

TABLE 3

| Run No. | Mixing method | On-mesh residue (wt %) | Density (g/cc) | Three-point bending strength (kg/mm$^2$) | Weibull modulus |
|---|---|---|---|---|---|
| 1 | (5-i) | 0.015 | 3.255 | 145 | 26 |
| *2 | (5-2) | 0.105 | 3.255 | 130 | 20 |

Note:
*Comparative example

As can be seen from the results of Table 3, the comparative sample (having a larger on-mesh residue) is inferior in both strength and Weibull modulus, indicating the significance of the present invention.

EXAMPLE 6

Particle size distribution (on a weight basis) of each of a commercially available powder having an average particle size of 0.5 μm which was obtained by an imide decomposition process (powder A) and a commercially available powder having an average particle size of 0.7 μm which was obtained by a direct nitriding process (powder B) was determined. The proportion of coarse particles of 5 μm or greater in powders A and B was found to be 0.1% and 3%, respectively. Powder A or B was dispersed according to mixing method (4-i) or (4-iii) of Example 4. The size distribution and the content of $Al_2O_3$ in each of the resulting powders were measured. The results obtained are shown in Table 4 below.

TABLE 4

| Starting powder | Mixing method | Weight ratio of particles of 5 μm or more (wt %) | $Al_2O_3$ content (wt %) |
|---|---|---|---|
| A | (4-i) | 0.1 | 0 |
| A | (4-iii) | 0.1 | 2.8 |
| B | (4-i) | 2.5 | 0 |
| B | (4-iii) | 1.0 | 3.0 |

It can be seen from the results of Table 4 that the mixing method according to the present invention makes it possible to inhibit the incorporation of impurities accompanying grinding while maintaining the size distribution of the starting $Si_3N_4$ powder.

Further, 5% of $Y_2O_3$ powder having an average particle size of 0.9 μm and 2% of $Al_2O_3$ powder having an average particle size of 0.3 μm were mixed according to mixing method (4-i) or (4-iii), and the mixture was dried and granulated. The resulting mixed powder was CIP molded at 5,000 kg/cm$^2$ and sintered at 1,750° C. for 6 hours in nitrogen gas. The sintered body was subjected to an HIP treatment at 1,700° C. for 1 hour in nitrogen gas at 1,000 atm.

Test pieces according to JIS R1601 (3×4×40 mm) were cut out of the sintered body, and the side on which tensile stress was to be applied was polished with a diamond paste so as to have a surface roughness of 0.2A. Conventional three point bending tests were carried out on 30 specimens per sample. The results obtained are shown in Table 5 below.

TABLE 5

| Run No. | Starting powder | Mixing method | Density (g/cc) | Three-point bending strength (kg/mm$^2$) | Weibull modulus |
|---|---|---|---|---|---|
| 1 | A | (4-i) | 3.255 | 146 | 25 |
| *2 | A | (4-iii) | 3.266 | 122 | 18 |
| *3 | B | (4-i) | 3.240 | 105 | 13 |
| *4 | B | (4-iii) | 3.259 | 110 | 15 |

Note:
*Comparative example

It is clearly demonstrated that the present invention makes it possible to uniformly mix the sintering aids without being accompanied by contamination with impurities while maintaining the size distribution of the starting powder to thereby provide a sintered body having high strength and high reliability.

EXAMPLE 7

Ninety-two percent of $Si_3N_4$ powder having an average particle size of 0.3 μm, a size distribution of $3\sigma=0.20$ μm, an α crystallinity of 96.5%, and an oxygen content of 1.4% and 0.5% of a carboxylic acid type deflocculating agent were mixed in isopropanol, and agglomerates of the $Si_3N_4$ powder in the mixture were deflocculated using a ultrasonic homogenizer at 5,000 rpm for 5 hours.

Separately, yttrium naphthenate and aluminum naphthenate were mixed in isopropanol in amounts of 2.5% in terms of $Y_2O_3$ and 1% in terms of $Al_2O_3$, respectively, and the mixture was mixed and dispersed in an ultrasonic homogenizer at 5000 rpm for 5 hours.

To the resulting dispersion was slowly added the above prepared $Si_3N_4$ dispersion, and the mixture was further stirred by means of a simple agitator (or an ultrasonic homogenizer) for 10 hours, whereby the organic metal salts were sufficiently and uniformly adsorbed on the surface of the $Si_3N_4$ particles.

Separately, 2.5% of $Y_2O_3$ powder having an average particle size of 0.9 μm, 1% of $Al_2O_3$ powder having an average particle size of 0.3 μm, and 1% of AlN powder having an average particle size of 0.9 μm were mixed in isopropanol, and 0.5% of a deflocculating agent was added thereto. The mixture was subjected to deflocculation using an ultrasonic homogenizer at 5,000 rpm for 5 hours.

To the resulting dispersion was slowly added the above prepared mixed dispersion while agitating with a simple agitator (or an ultrasonic homogenizer), and the agitation was further continued for an additional period of 10 hours to uniformly mix the sintering aids. After the solvent was removed by evaporation at a temperature between 50° C. and 80° C. so that the adsorbed organic metal salt would not be released or would not be decomposed and volatilized, the residue was oxidized in the atmosphere at 500° C. for 3 hours to convert the adsorbed organic metal salt to the corresponding oxide. The resulting mixed powder was CIP molded at 5,000 kg/cm$^2$ and sintered at 1,750° C. for 6 hours in nitrogen gas. The sintered body was subjected to an HIP treatment at 1,700° C. for 2 hours in nitrogen gas of 1,000 atm.

Test pieces according to JIS R 1601 (3×4×40 mm) were cut out of the sintered body, and the side to which tensile stress was to be applied was polished with a diamond paste so as to have a surface roughness of 0.2S. Conventional three-point bending tests were carried out on 30 specimens. As a result, the strength was 158 kg/mm$^2$, and the Weibull modulus was 18.

As described above, the sintered bodies according to the present invention, especially those obtained by the processes according to the present invention, exhibit markedly improved strength over conventional Si$_3$N$_4$ sintered bodies and are therefore applicable to various construction parts in machinery.

While the invention has been described in detail and with reference to specific embodiments thereof, it will be apparent to one skilled in the art that various changes and modifications can be made therein without departing from the spirit and scope thereof.

What is claimed is:

1. A process for producing a silicon nitride sintered product which comprises mixing (1) silicon nitride powder, (2) an organic metal salt as a first sintering aid, and (3) at least one of a metal oxide, a metal nitride, and a metal oxynitride as a second sintering aid, either separately or as a mixture of two or more of (1) to (3), wherein the amount of silicon nitride is at least 90% by weight or more, with a solvent and a surface active agent, inclusive of a dispersing agent and a deflocculating agent, subjecting the resulting mixture or mixtures to ultrasonic dispersion, mixing the resulting mixtures together followed by drying to obtain a mixed powder, which drying also oxidizes the organic metal salt and uniformly deposits the organic metal salt on the silicon nitride powder, molding the mixed powder to a molded article, and sintering the resulting molded article at a temperature of from 1,600° to 2,200° C. in a non-oxidizing atmosphere, said amount of silicon nitride being based on the weight of silicon nitride and sintering aids, and wherein said silicon nitride sintered product has a flexural strength of 100 kg/mm$^2$ or higher, which consists essentially of not less than 90% by weight of a single crystalline phase of silicon aluminum oxynitride of the formula Si$_{6-z}$Al$_z$O$_z$N$_{8-z}$, where z is a number of from 0 to 4.2, which silicon aluminum oxynitride comprises crystals having an average longer diameter of not more than 5 μm and an aspect ratio of not less than 5, said crystal phase constituting a network structure in the sintered body, the balance being a crystalline or amorphous glassy phase comprising one or more oxides or oxynitrides of a rare earth metal, a group 3A metal, a group 2A metal or Si, and wherein said sintered body contains not more than 500 ppm of one or more metallic elements selected from the group consisting of Cr, Co, Hf, Fe, Mo, Ni, Nb, Ti, W, and Zr.

2. A process as claimed in claim 1, wherein said organic metal salt is an organic metal salt of Y, Al, Y and Al, said metal oxide is Al$_2$O$_3$ l or Y$_2$O$_3$, and said metal nitride is AlN.

3. A process as claimed in claim 2, wherein said organic metal salt of Y, Al or Y and Al is at least one member selected from the group consisting of a stearate, a naphthenate, an acetylacetone complex, and an octylate.

4. A process as claimed in claim 2, wherein said organic metal salt of Y, Al or Y and Al is an alkoxy metal salt.

5. A process as claimed in claim 1, wherein said silicon nitride powder is silicon nitride powder having an average primary particles diameter of not more than 1.0 μm which is obtained by an imide decomposition process, and said sintering aids have an average primary particle diameter of not more than 1 μm.

6. A process as claimed in claim 1, wherein said sintering is carried out at a temperature of from 1,600° to 2,000° C. in a non-oxidizing atmosphere under a nitrogen gas pressure of from 10 to 2,000 atm.

7. A process as claimed in claim 1, wherein said mixture after ultrasonic dispersing is classified through a 44 μm or smaller mesh sieve.

8. A process as claimed in claim 1, wherein the amount of the first sintering aid is from 0.5 to 2% by weight based on the amount of the silicon nitride powder, the amount of the second sintering aid is 3 to 14.5% by weight based on the amount of the silicon nitride powder, the amount of the surface active agent is from 0.1 to 1.0% by weight of the silicon nitride powder and the first and second sintering aids, and the amount of the solvent is from 10 to 200% by weight based on the total amount of the silicon nitride powder.

9. The process of claim 1, wherein the second sintering aid is the metal oxide.

10. The process of claim 1, wherein the second sintering aid is the metal nitride.

11. The process of claim 1, wherein the second sintering aid is the metal oxynitride.

* * * * *